United States Patent
Han et al.

(10) Patent No.: US 9,898,161 B2
(45) Date of Patent: Feb. 20, 2018

(54) METHOD AND APPARATUS FOR CONTROLLING MULTITASKING IN ELECTRONIC DEVICE USING DOUBLE-SIDED DISPLAY

(71) Applicant: Samsung Electronics Co., Ltd., Suwon-si, Gyeonggi-do (KR)

(72) Inventors: Young-Eun Han, Seongnam-si (KR); Kwang-Tai Kim, Suwon-si (KR); Da-Som Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 451 days.

(21) Appl. No.: 14/152,384

(22) Filed: Jan. 10, 2014

(65) Prior Publication Data

US 2014/0201653 A1  Jul. 17, 2014

(30) Foreign Application Priority Data

Jan. 11, 2013  (KR) .................. 10-2013-0003393

(51) Int. Cl.
*G06F 3/0482* (2013.01)
*G06F 1/16* (2006.01)
(Continued)

(52) U.S. Cl.
CPC .......... *G06F 3/0482* (2013.01); *G06F 1/1626* (2013.01); *G06F 1/1692* (2013.01);
(Continued)

(58) Field of Classification Search
None
See application file for complete search history.

(56) References Cited

U.S. PATENT DOCUMENTS 8,416,148 B1 * 4/2013 Park .................. G06F 3/041
345/1.1
9,013,416 B2 * 4/2015 Huang ................ G06F 1/1643
345/173
(Continued)

FOREIGN PATENT DOCUMENTS

CN          101021766 A      8/2007
EP          EP1843563     * 10/2007  .............. G06F 1/16
(Continued)

OTHER PUBLICATIONS

Erh-li Shen et al.; Double-side Multi-touch Input for Mobile Devices; Apr. 4-9, 2009; ACM; pp. 4339-4344.*

*Primary Examiner* — Phenuel Salomon
(74) *Attorney, Agent, or Firm* — Jefferson IP Law, LLP

(57) ABSTRACT

A method of controlling multitasking in an electronic device using a double-sided display is provided. The method includes detecting a first gesture which reverses a first direction of a first screen executing a first application to a second direction or reverses the second direction of a second screen to the first direction, displaying a first list of applications on the second screen of the second direction is reversed to the first direction, when the first gesture is detected, detecting a input for selecting a second application from the first list of applications, and executing and displaying the touched second application on the second screen having the first direction.

27 Claims, 14 Drawing Sheets

(51) Int. Cl.
*G06F 3/0488* (2013.01)
*G06F 9/44* (2018.01)

(52) U.S. Cl.
CPC .......... *G06F 1/1694* (2013.01); *G06F 3/0488* (2013.01); *G06F 9/4443* (2013.01)

(56) References Cited

U.S. PATENT DOCUMENTS

| | | | |
|---|---|---|---|
| 2006/0277488 A1* | 12/2006 | Cok | G06F 3/04855 715/784 |
| 2007/0075915 A1* | 4/2007 | Cheon | G06F 1/1616 345/1.1 |
| 2007/0085759 A1* | 4/2007 | Lee | G06F 1/1616 345/1.1 |
| 2007/0188450 A1 | 8/2007 | Hernandez et al. | |
| 2007/0232336 A1 | 10/2007 | Kim et al. | |
| 2008/0072163 A1* | 3/2008 | Teng | G06F 1/1616 715/761 |
| 2009/0102744 A1* | 4/2009 | Ram | G06F 1/1601 345/1.1 |
| 2010/0156913 A1* | 6/2010 | Ortega | G06F 3/1438 345/520 |
| 2010/0289760 A1 | 11/2010 | Jonoshita et al. | |
| 2010/0302179 A1* | 12/2010 | Ahn | G06F 1/1618 345/173 |
| 2010/0306693 A1* | 12/2010 | Brinda | G06F 3/0488 715/784 |
| 2010/0321275 A1* | 12/2010 | Hinckley | G06F 1/1618 345/1.3 |
| 2010/0328191 A1* | 12/2010 | Smith | G06F 1/1626 345/1.3 |
| 2011/0001687 A1* | 1/2011 | Srinivasan | G06F 3/1431 345/3.1 |
| 2011/0045812 A1* | 2/2011 | Kim | G06F 1/1626 455/418 |
| 2011/0175805 A1* | 7/2011 | Rottler | G09G 5/00 345/156 |
| 2011/0191790 A1 | 8/2011 | Ba | |
| 2011/0247065 A1* | 10/2011 | Melnyk | G06F 3/04883 726/16 |
| 2012/0060089 A1 | 3/2012 | Heo et al. | |
| 2012/0124490 A1 | 5/2012 | Sirpal et al. | |
| 2012/0176403 A1 | 7/2012 | Cha et al. | |
| 2012/0235930 A1* | 9/2012 | Lazaridis | G06F 3/017 345/173 |
| 2012/0236037 A1* | 9/2012 | Lessing | G06F 3/017 345/661 |
| 2012/0274613 A1 | 11/2012 | Ishizuka | |
| 2013/0147712 A1* | 6/2013 | Zhou | G06F 1/1694 345/158 |
| 2013/0169545 A1* | 7/2013 | Eaton | H04M 1/0241 345/173 |
| 2013/0227495 A1* | 8/2013 | Rydenhag | G06F 3/04886 715/863 |
| 2014/0047379 A1 | 2/2014 | Urawaki et al. | |

FOREIGN PATENT DOCUMENTS

| | | | |
|---|---|---|---|
| EP | EP2341418 | * 7/2011 | ............ G06F 3/048 |
| JP | 2007-220109 A | 8/2007 | |
| JP | 2009-71735 A | 4/2009 | |
| JP | 2010-26064 A | 2/2010 | |
| KR | 20080038825 A | 5/2008 | |
| KR | 10-2011-0120858 A | 11/2011 | |
| WO | 2012/106092 A1 | 8/2012 | |
| WO | 2012/144632 A1 | 10/2012 | |
| WO | 2012177811 A1 | 12/2012 | |

* cited by examiner

METHOD AND APPARATUS FOR CONTROLLING MULTITASKING IN ELECTRONIC DEVICE USING DOUBLE-SIDED DISPLAY

CROSS-REFERENCE TO RELATED APPLICATION(S)

This application claims the benefit under 35 U.S.C. § 119(a) of a Korean patent application filed on Jan. 11, 2013 in the Korean Intellectual Property Office and assigned Serial number 10-2013-0003393, the entire disclosure of which is hereby incorporated by reference.

TECHNICAL FIELD

The present disclosure relates to an electronic device using a double-sided display.

BACKGROUND

Due to a development in hardware in an electronic device, namely, increases in processing speed and memory capacity, an electronic device may simultaneously perform several tasks (hereinafter, referred to as "multitasking").

For example, after an electronic device opens several windows respectively corresponding to documentation, communication, music and spreadsheet programs may be simultaneously executed on the respective windows and each program output may also be transferred to other windows in a simple way.

FIGS. 1A and 1B are an example of controlling multitasking on a portable communication terminal according to the related art.

Referring to FIGS. 1A to 1B, when a user executes two or more applications and performs multitasking, as illustrated in FIG. 1A, if the user presses a home key 100 for a long time or presses a home key 100 twice, then as illustrated in FIG. 1B, icons corresponding to six applications recently used 110 may be displayed. The home key 100 may be implemented as a soft key or a hardware key. Although FIG. 1B displays six recently used applications, it is obvious that less or more than six recently used applications may also be displayed.

In some implementations, icons corresponding to applications being currently executed instead of or in addition to recently used applications may be displayed.

As a technology develops, a study on various forms of displays has been consistently performed, and through such a study, a double-sided display technology has been applied to and used in an electronic device such as a portable communication terminal or a game console. The double-sided display device may perform an input and an output on both sides of the double-sided display.

Multitasking on a portable communication terminal according to the related art is performed as follows. A user opens two or more windows on a single display and performs tasks or displays on a single display a list of currently executed applications by using a specific key (e.g., a home key in FIG. 1A), and selects a currently executed application and performs a task. However, a multitasking technology using a double-sided display has not been considered.

Thus, in an environment in which a utilization range of the double display becomes various, there are needs for a method and device for efficiently controlling multitasking in consideration of the double-sided display.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and device for controlling multitasking in an electronic device using a double-sided display.

Another aspect of the present disclosure is to provide a multitasking method and device for an electronic device using a double-sided display.

Another aspect of the present disclosure is to provide a method and device for performing multitasking for user convenience in an electronic device using a double-sided display.

In accordance with an aspect of the present disclosure, a method of controlling multitasking in an electronic device using a double-sided display is provided. The method includes detecting a first gesture which reverses a first screen displaying a first application being executed from a first direction to a second direction or reverses a second screen from the second direction to the first direction, displaying a first list of applications on the second screen having the first direction, when the first gesture is detected, detecting a input for selecting a second application from the first list of applications, and executing and displaying the touched second application on the second screen.

In accordance with another aspect of the present disclosure, a method of controlling multitasking in an electronic device using a double-sided display is provided. The method includes detecting a gesture which reverses a first screen displaying a first application being executed from a first direction to a second direction and/or reverses a second screen from the second direction to the first direction, and executing and displaying a second application associated with the first application on the second screen, when the gesture is detected.

In accordance with another aspect of the present disclosure, a method of controlling multitasking in an electronic device using a double-sided display is provided. The method includes detecting a gesture which reverses a first screen displaying a first application being executed from a first direction to a second direction or reverses a second screen from the second direction to the first direction, checking a number of applications being executed on the background when the gesture is detected, and displaying, on the screen, the application being executed on the background, when the number of applications being executed on the background is one.

In accordance with another aspect of the present disclosure, an electronic device is provided. The electronic device includes a first screen, a second screen, at least one processor, a memory, and at least one program stored in the memory and configured to be executed by the at least one processor, wherein the at least one program includes instructions to: detect a first gesture which reverses a first screen displaying a first application being executed from a first direction to a second direction or reverses a second screen from the second direction to the first direction, display a first list of applications on the second screen having the first direction, when the first gesture is detected, detect a touch for selecting a second application from the first list of applications, and execute and display the touched second application on the second screen.

In accordance with another aspect of the present disclosure, an electronic device is provided. The electronic device includes a first screen, a second screen, at least one processor, a memory, and at least one program stored in the memory and configured to be executed by the at least one processors, wherein the at least one program includes instructions to: detect a gesture which reverses a first screen displaying a first application being executed from a first direction to a second direction or reverses a second screen from the second direction to the first direction, and execute and display a second application associated with the first application on the second screen, when the gesture is detected.

In accordance with another aspect of the present disclosure, a method of controlling multitasking in an electronic device using a double-sided display is provided. The method includes detecting a direction to which the double-sided display of the electronic device is reversed, and display a specific application on one side of the double-sided display of the electronic device, according to the direction to which the double-sided display of the electronic device is reversed.

In accordance with another aspect of the present disclosure, a method in an electronic device comprising a double-sided display is provided. The method includes detecting a change in orientation of the electronic device, and displaying a list of applications on a second display according to the detected change in the orientation of the electronic device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1B:
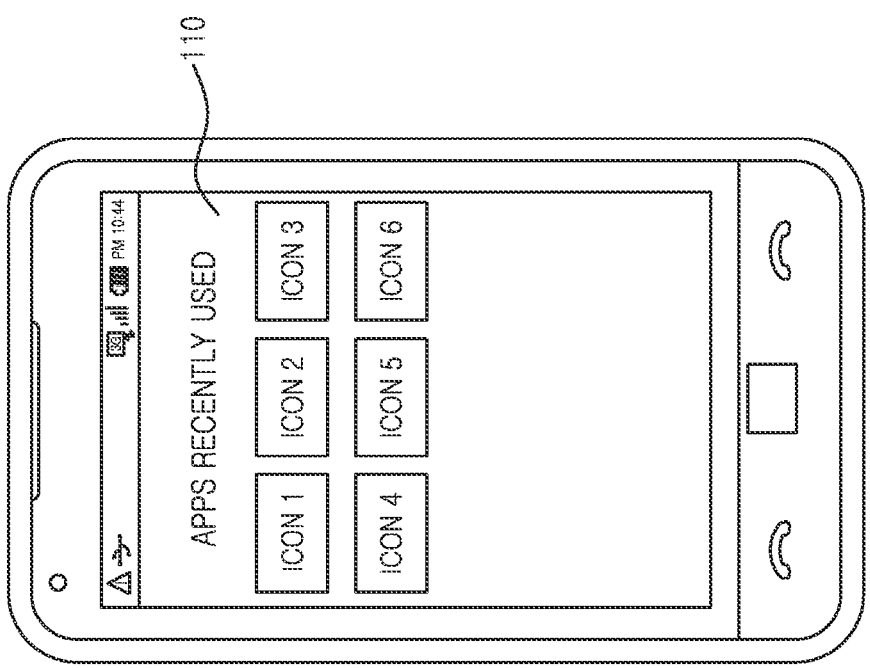
FIGS. 1A and 1B show a multitasking execution screen according to the related art.
Figure 1A:
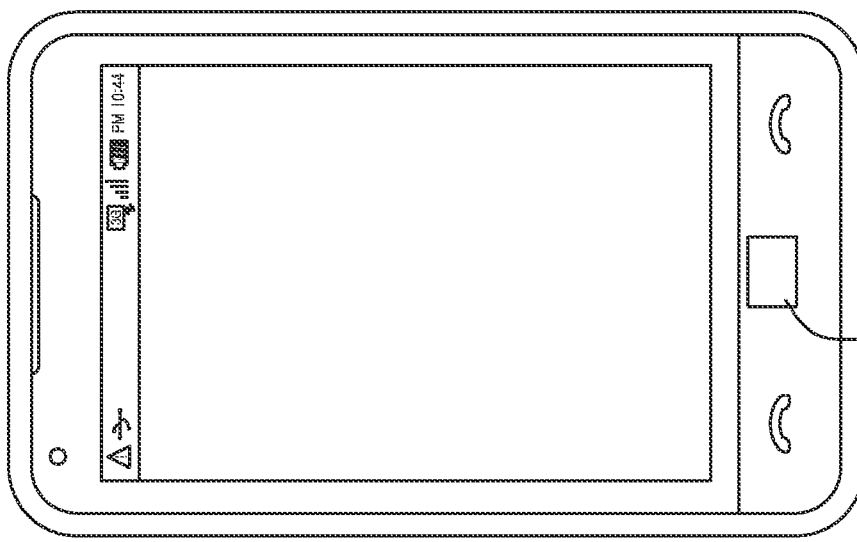

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

According to various embodiments of the present disclosure, an electronic device may include communication functionality. For example, an electronic device may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a Digital Video Disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., Magnetic Resonance Angiography (MRA) device, a Magnetic Resonance Imaging (MRI) device, Computed Tomography (CT) device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

A method and device for controlling multitasking in an electronic device using a double-sided display according to the present disclosure are described below.

Figure 2A:
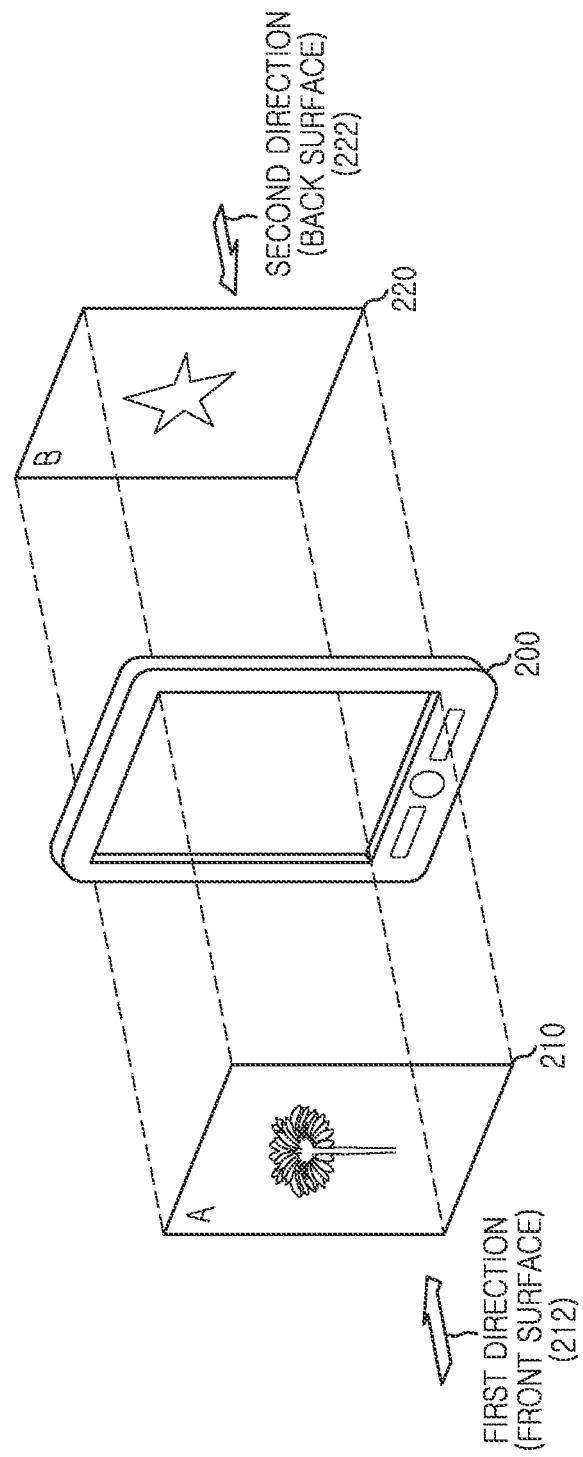
FIGS. 2A and 2B show examples of an electronic device using a double-sided display according to an embodiment of the present disclosure.
Figure 2B:
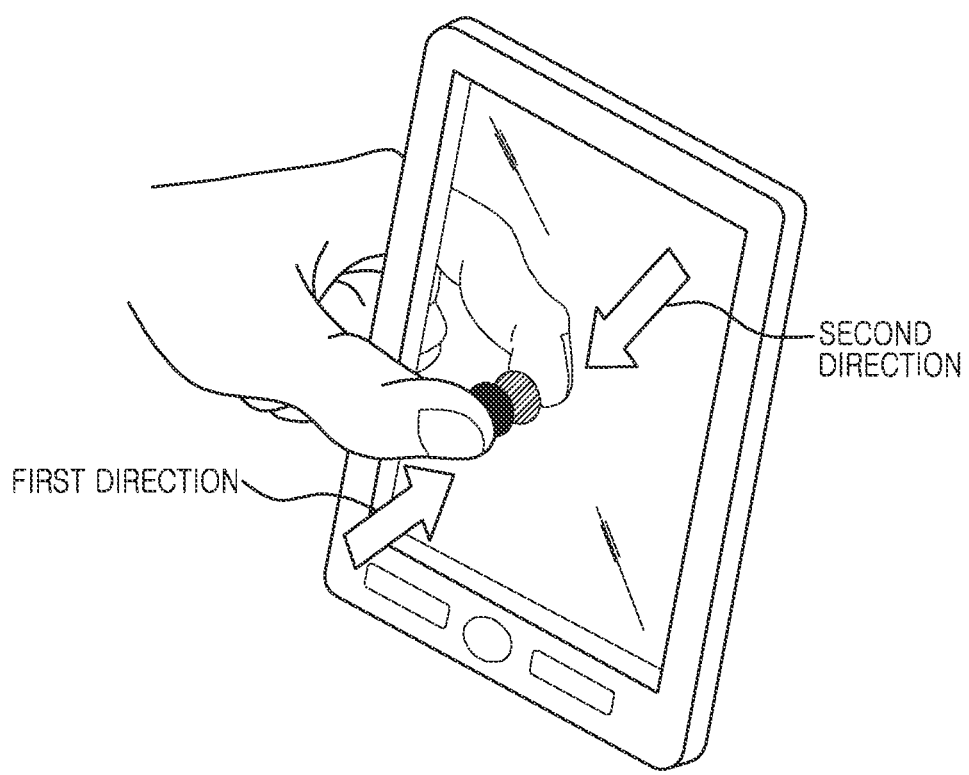

FIGS. 2A and 2B are examples of an electronic device using a double-sided display according to an embodiment of the present disclosure.

Referring to FIG. 2A, a first screen is displayed in a first direction 212 on a first display 210 of a double-sided adhesive electronic device 200 and a second screen is displayed in a second direction 222 on a second display 220 thereof.

According to various embodiments of the present disclosure, in the case of the non-transparent display, the double-sided adhesive electronic device 200 may simultaneously display the first screen 210 and the second screen 220. According to various embodiments of the present disclosure, in the case of the transparent display, when the first screen 210 is displayed, the second screen 220 may be inactivated and not displayed, and when the second screen 220 is displayed, the first screen 210 may be inactivated and not displayed.

Referring to FIG. 2B, the double-sided display may be implemented as a transparent display. In the case of the transparent display, when a user sees a screen in the first direction, a specific screen is displayed on the front surface of the screen and when the user sees the screen in the second direction, the specific screen is displayed by transmission on the back surface of the screen in a reverse direction.

Thus, in the case of the transparent display, different screens are not simultaneously displayed on the front surface (screen corresponding to the first direction) and the back surface (screen corresponding to the second direction).

A multitasking method considering the double-sided display of FIG. 2A or 2B is described below.

FIGS. 3A, 3B, 3C, 3D, and 3E show multitasking control screens of an electronic device using a double-sided display according to an embodiment of the present disclosure.

Figure 3A:
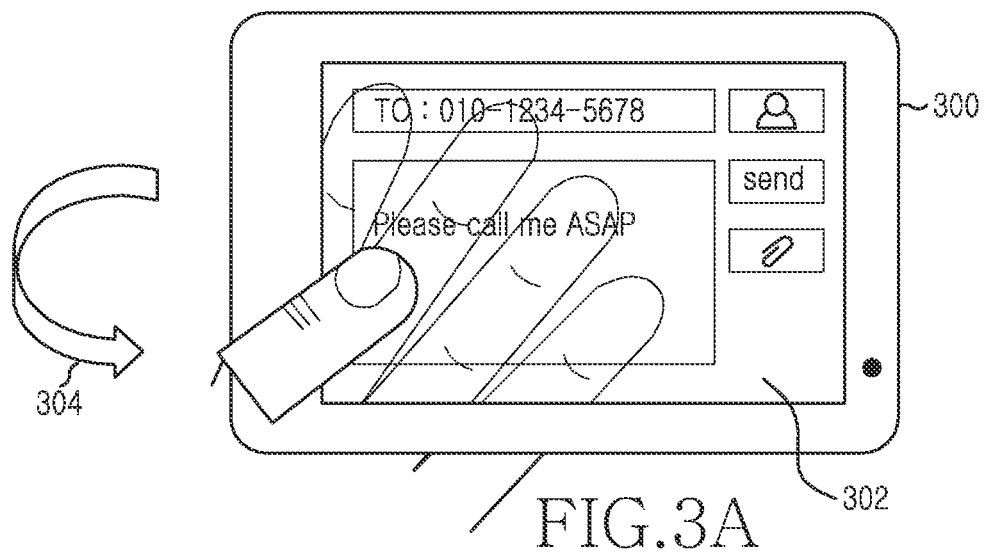
FIGS. 3A, 3B, 3C, 3D, and 3E show multitasking control screens of an electronic device using a double-sided display according to an embodiment of the present disclosure.
Figure 3B:
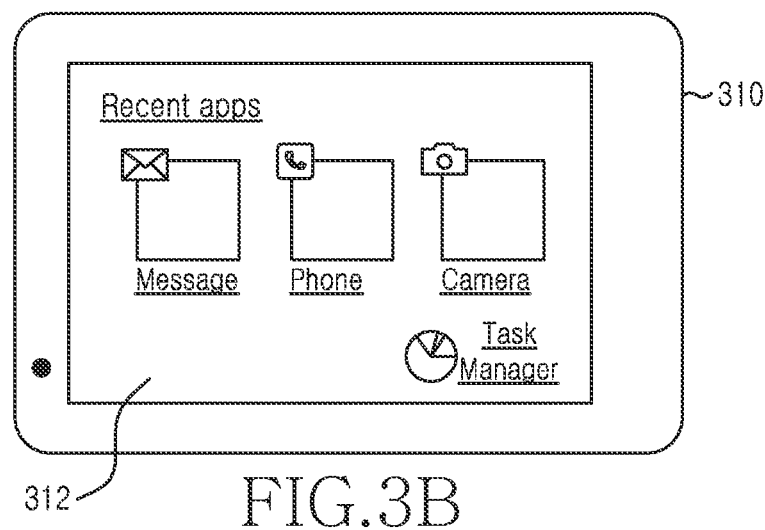

Referring to FIG. 3A, if a front display 300 and a back display 310 are horizontally reversed 304 by a user while a messenger application 302 is executed on the front display 300, a list of applications 312 recently executed is displayed on the back display 310 as illustrated in FIG. 3B.

According to various embodiments of the present disclosure, as illustrated in FIG. 3B, if the front display 300 and the back display 310 are vertically reversed 304 by a user, the list of applications 312 recently executed may also be displayed on the back display 310.

Figure 3C:
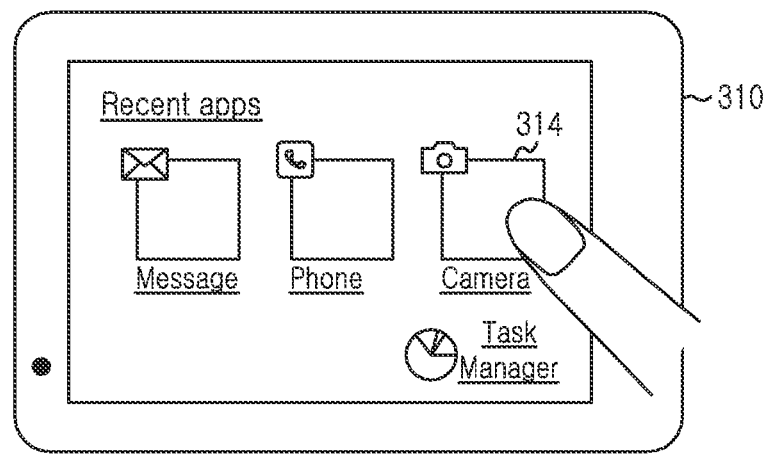
Figure 3D:
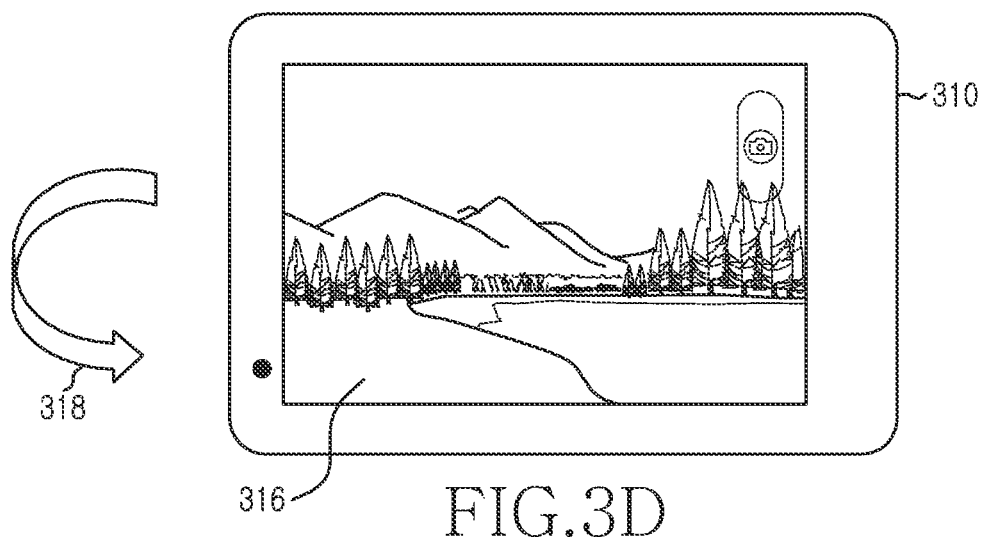
Figure 3E:
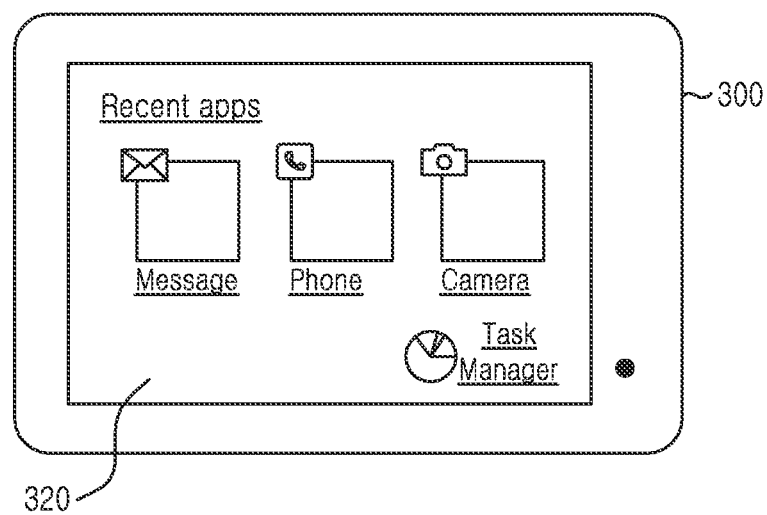

According to various embodiments of the present disclosure, a list of applications being executed on the background or a list of all applications may be displayed instead of the list of applications recently executed. Subsequently, as illustrated in FIG. 3C, if an application (e.g., a camera application 314) is touched by a user from a list of applications displayed on the back display 310, the camera application is executed and a corresponding screen is represented on the back display 310 as illustrated in FIG. 3D. For example, as illustrated in FIG. 3D, a preview screen 316 is displayed. In this case, if the front display 300 and the back display 310 are horizontally reversed 318 again by a user, a list of applications 320 recently executed is displayed on the front display 300 as illustrated in FIG. 3E. According to various embodiments of the present disclosure, a list of applications being executed on the background or a list of all applications may be displayed instead of the list of applications recently executed.

According to various embodiments of the present disclosure, the front display 300 and the back display 310 may be simultaneously displayed. According to various embodiments of the present disclosure, when the front display 300 is displayed, the back display 310 may be inactivated and not displayed and when the back display 310 is displayed, the front display 300 may be inactivated and not displayed.

FIGS. 4A, 4B, 4C, 4D, and 4E show multitasking control screens of an electronic device using a double-sided display according to an embodiment of the present disclosure.

Figure 4A:
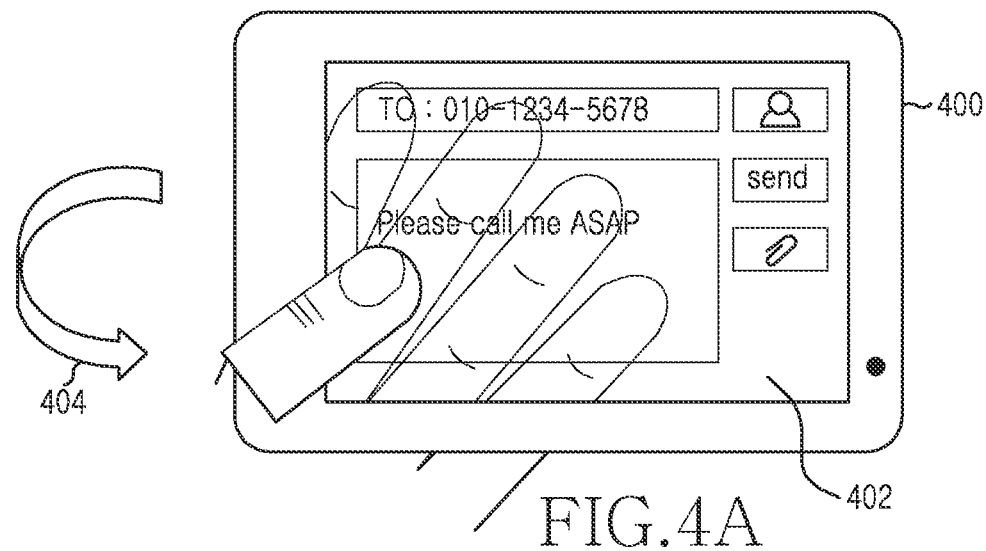
FIGS. 4A, 4B, 4C, 4D, and 4E show multitasking control screens of an electronic device using a double-sided display according to an embodiment of the present disclosure.
Figure 4B:
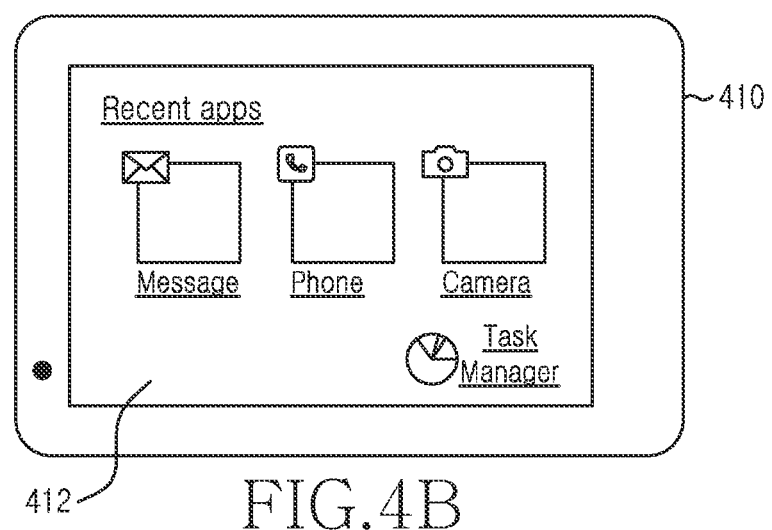

Referring to FIG. 4A, if a front display 400 and a back display 410 are horizontally reversed 404 by a user while a messenger application 402 is executed on the front display 400, then, as illustrated in FIG. 4B, a list of applications 412 recently executed is displayed on the back display 410.

According to various embodiments of the present disclosure, if the front display 400 and the back display 410 are vertically reversed 404 by a user, the list of applications 412 recently executed may also be displayed on the back display 410 as illustrated FIG. 4B.

Figure 4C:
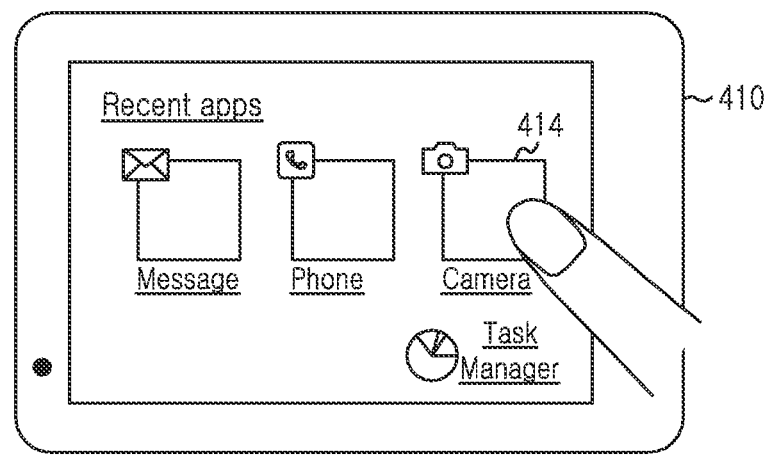
Figure 4D:
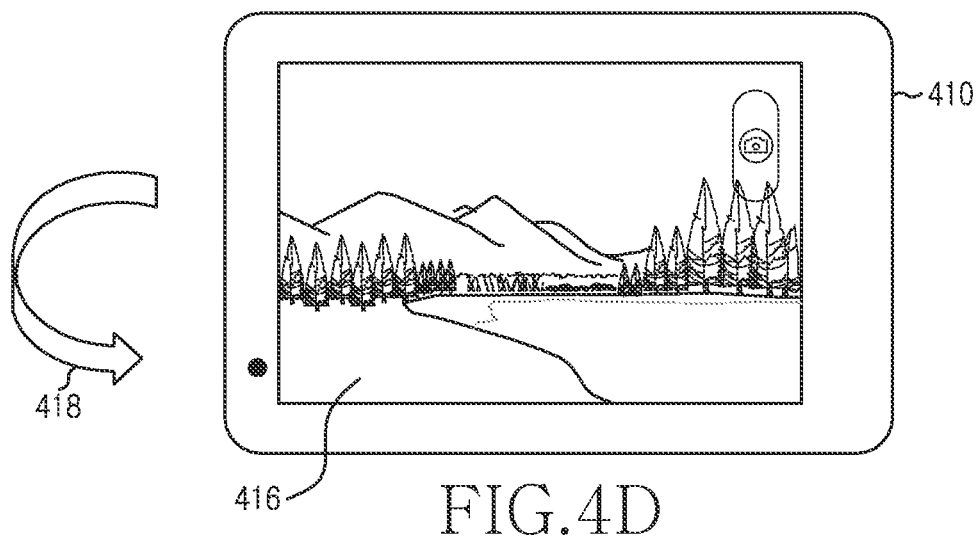
Figure 4E:
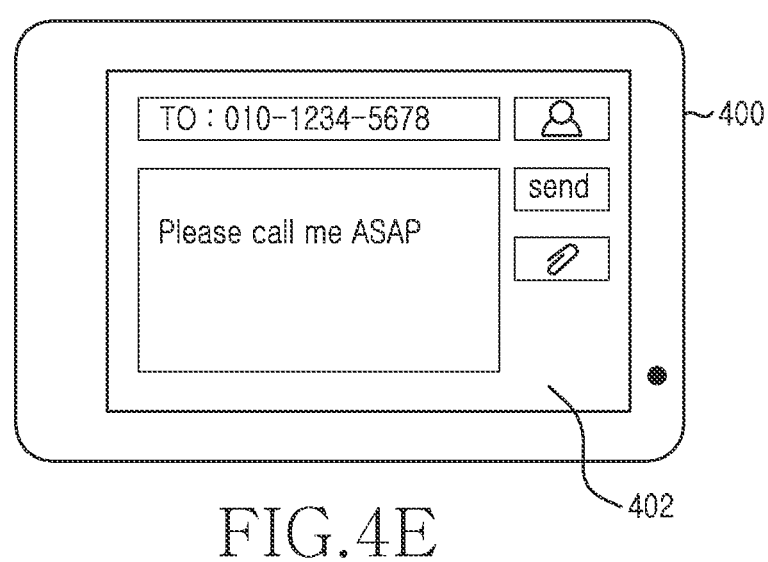

According to various embodiments of the present disclosure, a list of applications being executed on the background or a list of all applications may be displayed instead of the list of applications recently executed. Subsequently, as illustrated in FIG. 4C, if an application (e.g., a camera application 414) is touched by a user from a list of applications displayed on the back display 410, the camera application is executed and, as illustrated in FIG. 4D, a corresponding screen is displayed on the back display 410. For example, as illustrated in FIG. 4D, a preview screen 416 is displayed. In this case, if the front display 400 and the back display 410 are horizontally reversed 418 again by a user, then, as illustrated in FIG. 4E, the messenger application 402 previously executed is displayed on the front display 400.

According to various embodiments of the present disclosure, the front display 400 and the back display 410 may be simultaneously displayed. According to various embodiments of the present disclosure, when the front display 400 is displayed, the back display 410 may be inactivated and not displayed and when the back display 410 is displayed, the front display 400 may be inactivated and not displayed.

Figure 5A:
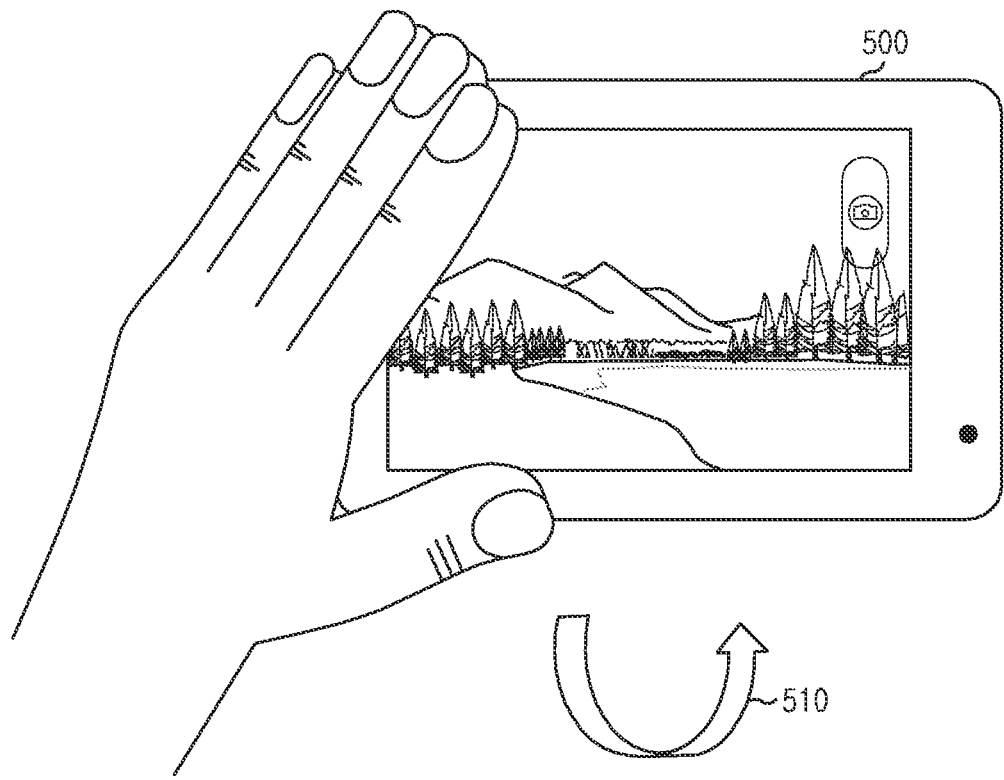
FIGS. 5A and 5B show multitasking control screens of an electronic device using a double-sided display according to an embodiment of the present disclosure.
Figure 5B:
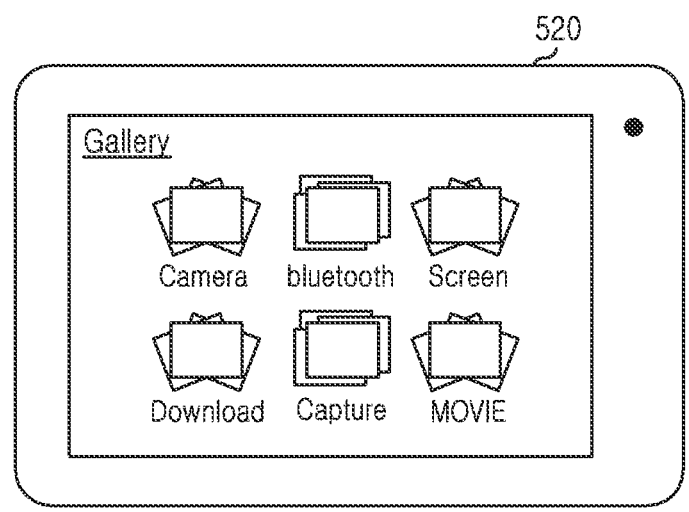

FIGS. 5A and 5B show multitasking control screens of an electronic device using a double-sided display according to an embodiment of the present disclosure.

Referring to FIG. 5A, if a front display 500 and a back display 520 are vertically reversed 510 by a user while a camera application is executed on the front display 500, then, as illustrated in FIG. 5B, a gallery application linked to the camera application is executed and displayed on the back display 520. The gallery application plays a role of managing images and displaying images to users. For example, the gallery application may manage and display images that are stored on the electronic device.

According to various embodiments of the present disclosure, if the front display 500 and the back display 520 are horizontally reversed 510 by a user, then, as illustrated in FIG. 5B, a gallery application linked to a camera application may be executed and displayed on the back display 520.

According to various embodiments of the present disclosure, the front display 500 and the back display 520 may be simultaneously displayed. According to various embodiments of the present disclosure, when the front display 500 is displayed, the back display 520 may be inactivated and not displayed and when the back display 520 is displayed, the front display 500 may be inactivated and not displayed.

Figure 6A:
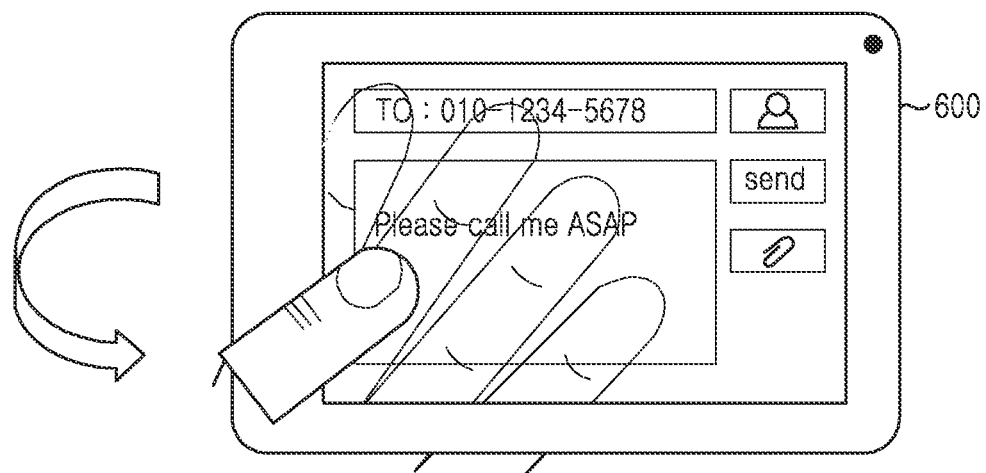
FIGS. 6A and 6B show multitasking control screens of an electronic device using a double-sided display according to an embodiment of the present disclosure.
Figure 6B:
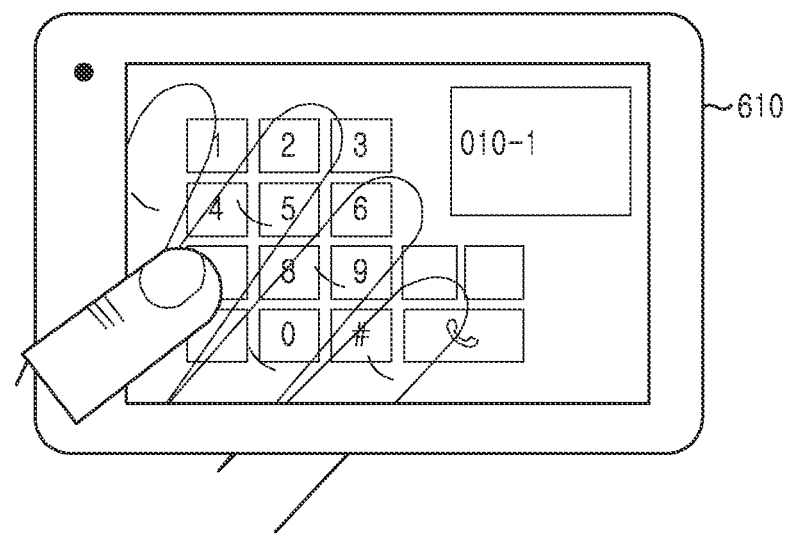

FIGS. 6A and 6B show multitasking control screens of an electronic device using a double-sided display according to an embodiment of the present disclosure.

Referring to FIG. 6A, if a front display 600 and a back display 610 are horizontally or vertically reversed 620 by a user while a messenger application is executed on the front display 600, then, as illustrated in FIG. 6B, an application (e.g., an application for making a call) being executed on the background is displayed on the back display 610.

According to various embodiments of the present disclosure, when one application is being executed on the background, a list of applications is not displayed but immediately displays the application being executed. In contrast, according to various embodiments of the present disclosure, when more than one applications are being executed on the background, a list of applications being executed is displayed as illustrated in FIG. 3B.

According to various embodiments of the present disclosure, the front display 600 and the back display 610 may be simultaneously displayed. According to various embodiments of the present disclosure, when the front display 600 is displayed, the back display 610 may be inactivated and not displayed and when the back display 610 is displayed, the front display 600 may be inactivated and not displayed.

FIGS. 3A to 6B vertically or horizontally show a list of applications recently executed, a list of applications being executed on the background or a list of all applications. According to various embodiments of the present disclosure, displaying a plurality of lists of applications according to a direction to which the screen of an electronic device is reversed may be possible. For example, when a front display and a back display are reversed through a rightward rotation, a list of applications recently executed may be displayed, when the front display and the back display are reversed through a leftward rotation, a list of applications being executed on the background may be displayed, and when the front display and the back display are reversed through an upward rotation, a list of all applications may be displayed.

According to various embodiments of the present disclosure, a user may configure a list of applications to be displayed on a display according to a rotation of the electronic device. For example, a user may configure a list of favorite applications that may be displayed. The list of favorite applications may be displayed according to a specific rotation of the electronic device. As another example, a user may configure the electronic device to display a list of most recently downloaded applications, a list of applications corresponding to a specific functionality, a list of applications corresponding to a specific type of applications (e.g., applications for communicating, applications for gaming, applications for media play back, and the like).

According to various embodiments of the present disclosure, displaying an application by selecting or executing that application according to a direction in which the screen of the electronic device is reversed may be possible. For example, when a front display and a back display are reversed through a rightward direction, a first application may be displayed on the reversed front display, when the front display and the back display are reversed through a leftward direction, a second application may be displayed on the reversed front display, when the front display and the back display are reversed through an upward direction, a third application may be displayed on the reversed front display, and when the front display and the back display are reversed through a downward direction, a fourth application may be displayed on the reversed front display. In this example, the reversed front display corresponds to a display that a user may see when the electronic device rotates, and the first to the fourth applications may be applications that have been recently executed, are being executed on the background or have not been executed.

According to various embodiments of the present disclosure, directions are not limited to the rightward, leftward, upward, and downward directions and may have less or more than four directions to map to corresponding applications.

Figure 7:
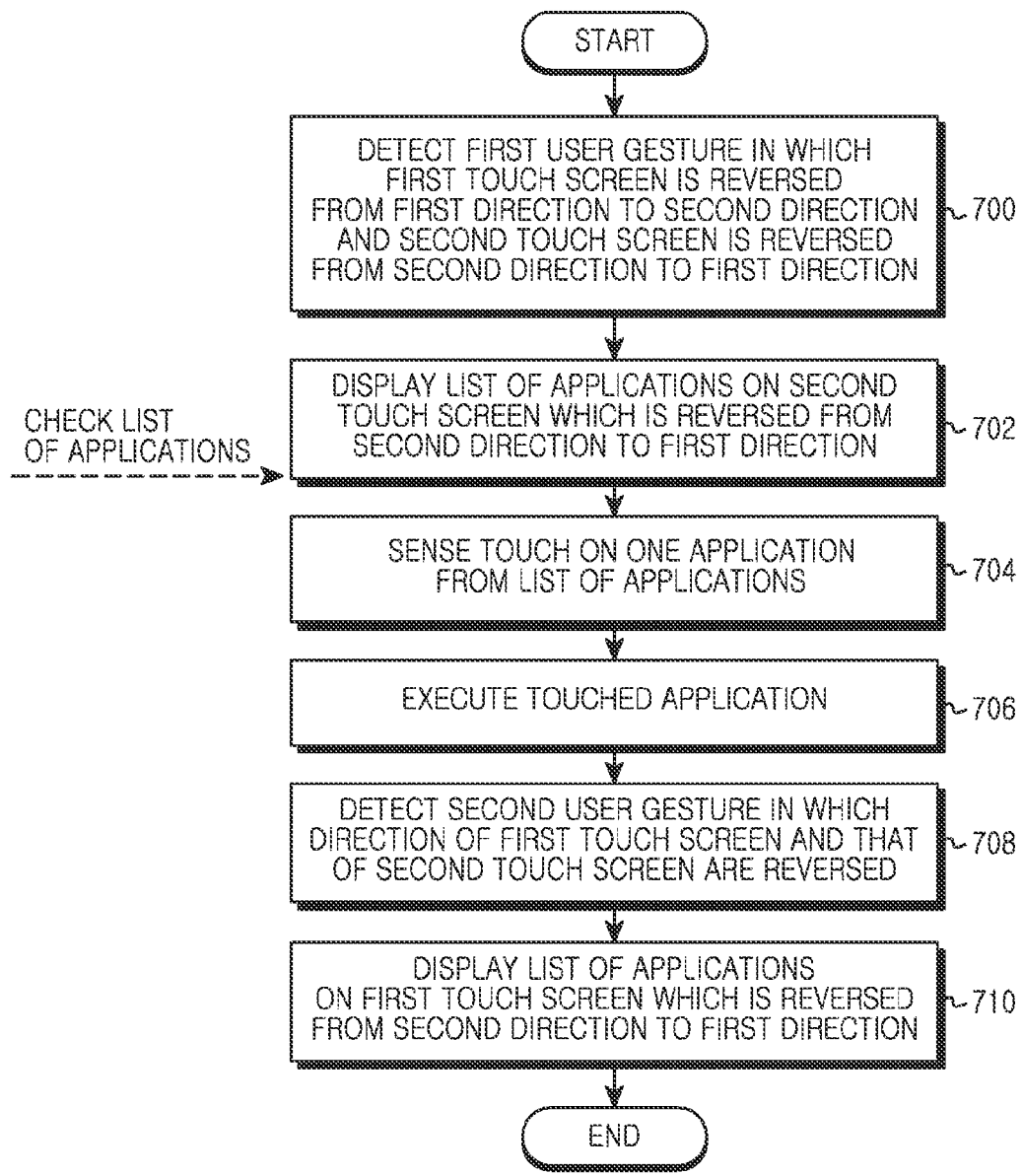
FIG. 7 is a multitasking control flow chart of an electronic device using a double-sided display according to an embodiment of the present disclosure.

FIG. 7 is a multitasking control flow chart of an electronic device using a double-sided display according to an embodiment of the present disclosure.

Referring to FIG. 7, at operation 700, the electronic device detects a first gesture which reverses a first direction of a first screen executing a first application to a second direction (and reverses the second direction of a second screen to the first direction. For example, as illustrated in FIG. 3A, the electronic device detects that a front display and a back display are horizontally reversed by a user.

Thereafter, at operation 702, the electronic device displays a first list of applications on the second screen of which the second direction is reversed to the first direction as illustrated in FIG. 3B, when the first gesture is detected. The first list of applications is one of a multitasking list representing applications being executed on the background, a history list representing applications previously executed, and a list of all applications.

Thereafter, at operation 704, the electronic device detects a touch for selecting a second application among the first list of applications.

At operation 706, the electronic device executes and displays the touched second application on the second screen having the first direction.

Thereafter, at operation 708, the electronic device detects a second gesture which reverses the first direction of the second screen executing the second application to the second direction and reverses the second direction of the first screen to the first direction.

Thereafter, at operation 710, the electronic device displays a second list of applications on the first screen of which the second direction is reversed back to the first direction, when the second gesture is detected. The second list of applications is one of a multitasking list representing applications being executed on the background, a history list representing applications previously executed, and a list of all applications.

Thereafter, the procedures of the various embodiments of the present disclosure are ended.

Figure 8:
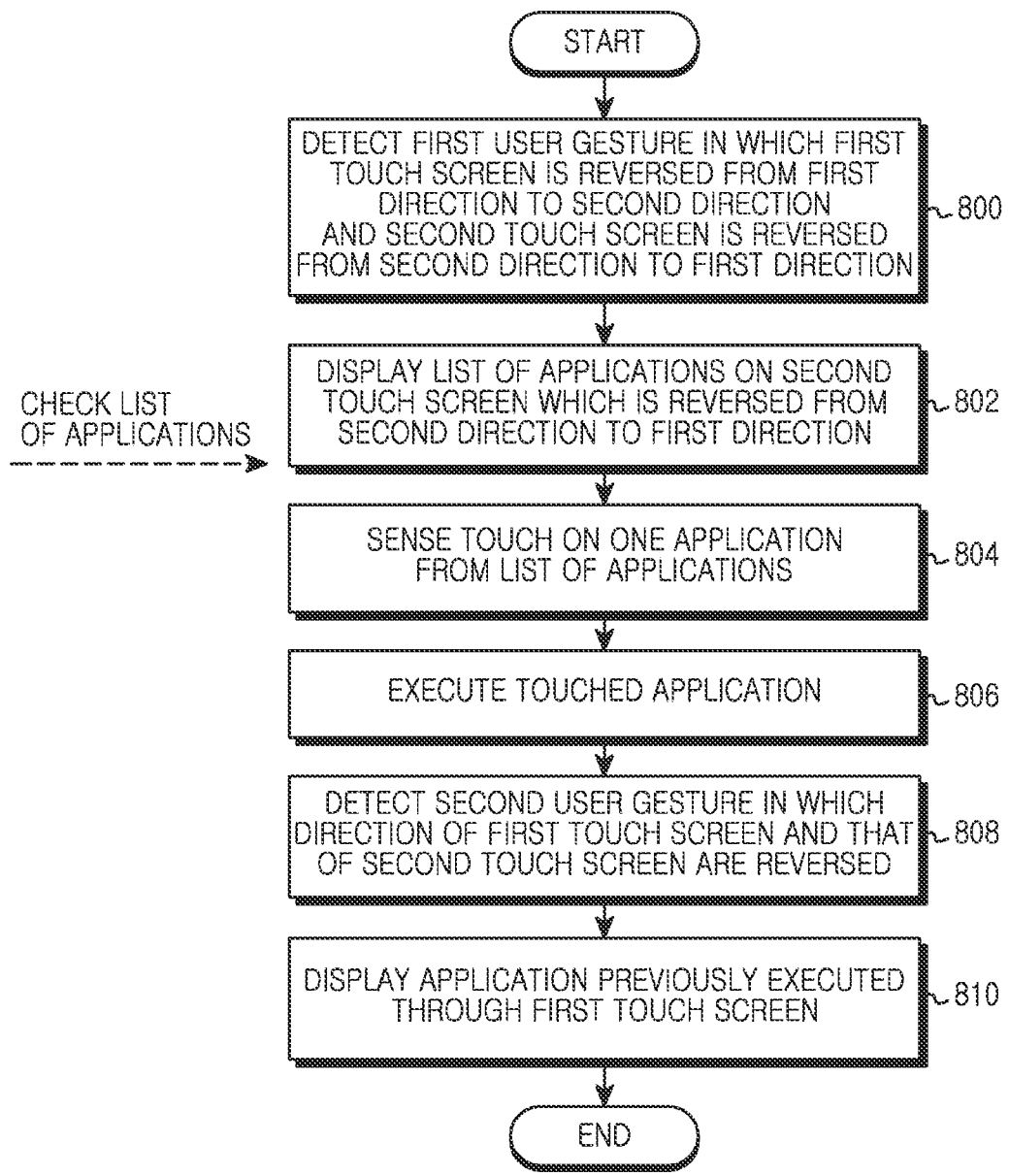
FIG. 8 is a multitasking control flow chart of an electronic device using a double-sided display according to an embodiment of the present disclosure.

FIG. 8 is a multitasking control flow chart of an electronic device using a double-sided display according to an embodiment of the present disclosure.

Referring to FIG. 8, at operation 800, the electronic device detects a first gesture which reverses a first direction of a first screen executing a first application to a second direction and reverses the second direction of a second screen to the first direction. For example, as illustrated in FIG. 4A, the electronic device detects that a front display and a back display are horizontally reversed by a user.

Thereafter, at operation 802, the electronic device displays a first list of applications on the second screen of which the second direction is reversed to the first direction as illustrated in FIG. 4B, when the first gesture is detected. The first list of applications is one of a multitasking list representing applications being executed on the background, a history list representing applications previously executed, and a list of all applications.

If the first list of applications is the history list, the first application being executed is not included in the first list of applications.

Thereafter, at operation 804, the electronic device detects a touch for selecting a second application among the first list of applications.

At operation 806, the electronic device executes and displays the touched second application on the second screen having the first direction.

Thereafter, at operation 808, the electronic device detects a second gesture which reverses the first direction of the second screen executing the second application to the second direction and reverses the second direction of the first screen to the first direction.

Thereafter, at operation 810, the electronic device displays the first application previously executed on the first screen having the first direction, when the second gesture is detected.

Thereafter, the procedures of the various embodiments of the present disclosure are ended.

Figure 9:
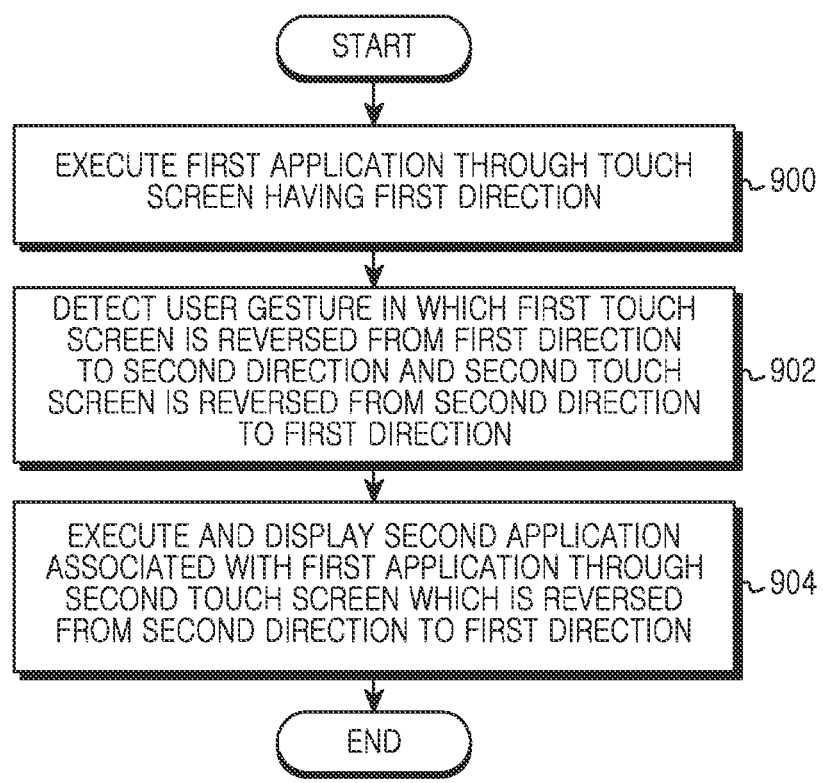
FIG. 9 is a multitasking control flow chart of an electronic device using a double-sided display according to an embodiment of the present disclosure.

FIG. 9 is a multitasking control flow chart of an electronic device using a double-sided display according to an embodiment of the present disclosure.

Referring to FIG. 9, at operation 900, the electronic device executes a first application through a first direction, namely, a first screen.

Thereafter, at operation 902, the electronic device detects a gesture which reverses the first direction of the first screen executing the first application to a second direction and reverses the second direction of a second screen to the first direction. For example, as illustrated in FIG. 5A, the electronic device detects that a front display and a back display are vertically (or horizontally) reversed by a user.

Thereafter, at operation 904, the electronic device executes and displays a second application associated with the first application on the second screen having the first direction, when the gesture is detected.

Thereafter, the procedures of the various embodiments of the present disclosure are ended.

Figure 10:
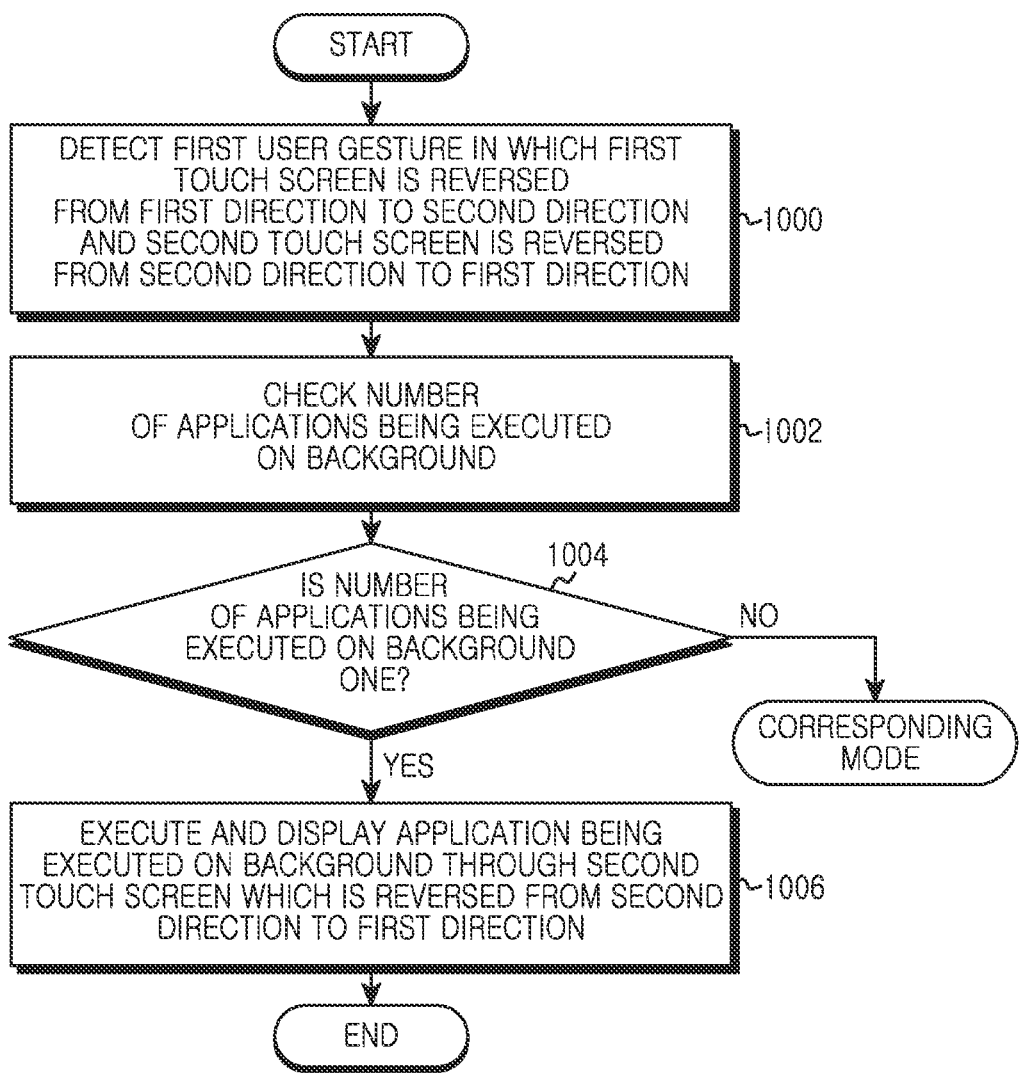
FIG. 10 is a multitasking control flow chart of an electronic device using a double-sided display according to an embodiment of the present disclosure.

FIG. 10 is a multitasking control flow chart of an electronic device using a double-sided display according to an embodiment of the present disclosure.

Referring to FIG. 10, at operation 1000, the electronic device detects a gesture which reverses a first direction of a first screen executing a first application to a second direction and reverses the second direction of a second screen to the first direction. For example, as illustrated in FIG. 6A, the electronic device detects that a front display and a back display are vertically (or horizontally) reversed by a user.

Thereafter, at operation 1002, the electronic device determines (e.g., checks) the number of applications being executed on the background when the gesture is detected.

Thereafter, at operation 1004, the electronic device determines whether the number of applications being executed the background when the gesture is detected corresponds to one application.

When the electronic device determines that the number of applications being executed on the background is one at operation 1004, the electronic device proceeds to operation 1006 at which the electronic device displays the application being executed on the background on a second screen having the first direction.

In contrast, when the electronic device determines that the number of applications being executed on the background is not one at operation 1004, a corresponding mode is performed. For example, in the corresponding mode, the electronic device displays a list of applications on the second screen of which the second direction is reversed to the first direction, detects a touch for selecting one application from the list of applications, executes and displays the touched application on the second screen having the first direction.

Thereafter, the procedures of the various embodiments of the present disclosure are ended.

Figure 11:
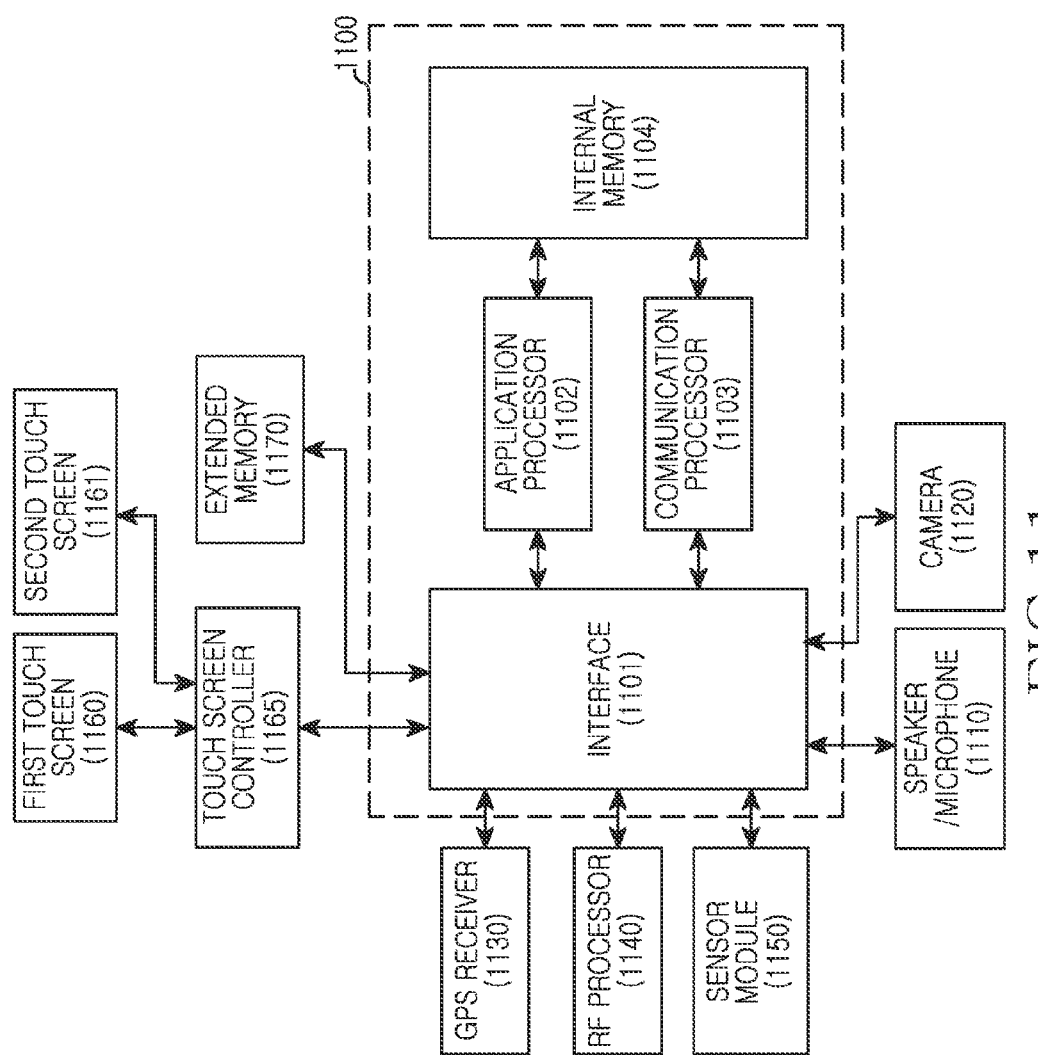
FIG. 11 is a block diagram of an electronic device according to an embodiment of the present disclosure.

FIG. 11 is a block diagram of an electronic device according to an embodiment of the present disclosure.

Referring to FIG. 11, the electronic device includes a controller 1100, a speaker/microphone 1110, a camera 1120, a GPS receiver 1130, an RF processor 1140, a sensor module 1150, two screens (e.g., a first screen 1160 and second screen 1161), a screen controller 1165, and an extended memory 1170.

The controller 1100 may include an interface 1101, one or more processors (e.g., an application processor 1102 and a communication processor 1103), and an internal memory 1104. According to various embodiments of the present disclosure, the controller 1100 itself is referred to also as a processor. The interface 1101, the application processor 1102, the communication processor 1103, and the internal memory 1140 may be separate components or be in one or more integrated circuits.

The application processor 1102 executes several software programs to perform several functions for the electronic device and the communication processor 1103 performs processing and control for voice communication and data communication. In addition to such typical functions, the processors (e.g., the application processor 1102 and the communication processor 1103) also play a role of executing specific software modules (an instruction set) stored in the extended memory 1170 or the internal memory 1104 and performing specific several functions corresponding to the modules. For example, the processors (e.g., the application processor 1102 and the communication processor 1103) perform a multitasking control method (see FIGS. 7 to 10) in an electronic device using a double-sided display according to various embodiments of the present disclosure in cooperation with software modules stored in the extended memory 1170 or the internal memory 1104.

According to various embodiments of the present disclosure, the application processor 1102 detects a first gesture which reverses a first direction of a first screen 1160 executing a first application to a second direction and reverses the second direction of a second screen 1161 to the first direction. For example, as illustrated in FIG. 3A, the application processor 1102 detects that a front display and a back display are horizontally reversed by a user. In addition, when the first gesture is detected, the application processor 1102 displays a first list of applications on the second screen 1161 of which the second direction is reversed to the first direction as illustrated in FIG. 3B. The application processor 1102 detects a touch for selecting a second application from the first list of applications, executes and displays the touched second application on the second screen having the first direction, and detects a second gesture which reverses the first direction of the second screen executing the second application to the second direction and reverses the second direction of the first screen to the first direction. In addition, when the second gesture is detected, the application processor 1102 displays a second list of applications on the first screen of which the second direction is reversed back to the first direction. Each of the first and the second lists of applications is one of a multitasking list representing applications being executed on the background, a history list representing applications previously executed, a list of all applications, and the like.

According to various embodiments of the present disclosure, the application processor 1102 detects a first gesture which reverses a first direction of a first screen executing a first application to a second direction and reverses the second direction of a second screen 1161 to the first direction. For example, as illustrated in FIG. 4A, the application processor 1102 detects that a front display and a back display are horizontally reversed by a user. In addition, when the first gesture is detected, the application processor 1102 displays a first list of applications on the second screen of which the second direction is reversed to the first direction as illustrated in FIG. 4B. The application processor 1102 detects a touch for selecting a second application from the first list of applications, executes and displays the touched second application on the second screen having the first direction, and detects a second gesture which reverses the first direction of the second screen executing the second application to the second direction and reverses the second direction of the first screen to the first direction. In addition, when the second gesture is detected, the application processor 1102 displays the first application previously executed on the first screen having the first direction.

According to various embodiments of the present disclosure, the application processor 1102 executes a first application through a first direction, namely, a first screen, and detects a gesture which reverses the first direction of the first screen executing the first application to a second direction and reverses the second direction of a second screen to the first direction. As illustrated in FIG. 5A, the processor 1102 detects that a front display and a back display are vertically (or horizontally) reversed by a user, executes and displays a second application associated with the first application on the second screen having the first direction when the gesture is detected.

According to various embodiments of the present disclosure, the application processor 1102 detects a gesture which reverses a first direction of a first screen executing a first application to a second direction and reverses the second direction of a second screen to the first direction. For example, as illustrated in FIG. 6A, the application processor 1102 detects that a front display and a back display are vertically (or horizontally) reversed by a user, determines (e.g., checks) the number of applications being executed on the background when the gesture is detected, and displays the application being executed on the background on the second screen having the first direction when the number of the applications being executed on the background is one. In contrast, when the number of applications being executed on the background is not one, the application processor 1102 performs a corresponding mode. For example, in the corresponding mode, the application processor 1102 displays a list of applications on the second screen of which the second direction is reversed to the first direction, detects a touch for selecting one application from the list of applications, executes and displays the touched application on the second screen having the first direction.

The interface 1101 couples the screen controller 1165 of the electronic device to the extended memory 1170. The sensor module 1150 is coupled to the interface 1101 to enable several functions. For example, a six-axis sensor is coupled to the interface 1101 to enable the motion sensing of the electronic device and external-light sensing. For example, the sensor module 1150 uses a six-axis sensor to detect the directions of the first screen 1160 and the second screen 1161.

The camera 1120 is coupled to the sensor module 1150 through the interface 1101 and may perform a camera function such as picture and video clip recording.

The RF processor 1140 performs a communication function. For example, the RF processor 1140 converts an RF signal into a baseband signal under the control of the communication processor 1103 and provides the signal obtained through the conversion to the communication processor 1103 or converts and transmits the base band signal from the communication processor 1103 to the RF signal. In this example, the communication processor 1103 processes the base band signal by using various communication techniques. For example, the communication techniques may include, but not be limited to, Global System for Mobile communication (GSM), Enhanced Data GSM Environment (EDGE), Code Division Multiple Access (CDMA), W-Code Division Multiple Access (W-CDMA), Long Term Evolution (LTE), Orthogonal Frequency Division Multiple Access (OFDMA), Wireless Fidelity (Wi-Fi), WiMax, Bluetooth, and/or the like.

The speaker/microphone 1110 may be configured for audio steam input and output such as voice recognition, voice copy, digital recording and call functions. For example, the speaker/microphone 1110 converts a voice signal into an electrical signal or converts the electrical signal into the voice signal. Although not shown, an earphone, a head phone, head set, and/or the like that is attachable and detachable may be coupled to the electronic device through an external port.

The screen controller 1165 may be coupled to the first screen 1160 and the second screen 1161. The first screen 1160, the second screen 1161, and/or the screen controller 1165 may use, but may not be limited to, capacitive, resistive, infrared, and surface acoustic wave technologies, and/or the like for determining one or more contact points with each screen and any multi-touch sensing technology including a proximity sensor arrangement or other elements to detect a contact and motion or their interruptions.

The first screen 1160 and the second screen 1161 provide input/output interfaces between the electronic device and a user. For example, the first screen 1160 and the second screen 1161 deliver user's touch inputs to the electronic device. The first screen 1160 and the second screen 1161 are mediums that show outputs from the electronic device to the users. For example, the first screen 1160 and the second screen 1161 show visual outputs to the users. Such visual outputs are indicated in a type of text, graphic, video, and a combination thereof.

Several displays may be used for the first screen 1160 and/or the second screen 1161. For example, a Liquid Crystal Display (LCD), a Light-Emitting Diode (LED), a Light-emitting Polymer Display (LPD), an Organic Light Emitting Diode (OLED), an Active Matrix Organic Light Emitting Diode (AMOLED) or a Flexible LED (FLED), and/or the like may be used. However, various embodiments of the present disclosure are not limited thereto.

The GPS receiver 1130 converts a signal received from an artificial satellite into information such as a location, a speed, a time, and/or the like. For example, the distance between the satellite and the GPS receiver is calculated by multiplying the speed of light by a signal arrival time, and the location of the electronic device is measured by using a known triangulation principle by finding the accurate locations and distances of three satellites.

The extended memory 1170 or the internal memory 1104 may include non-volatile memories or high-speed random access memories such as one or more magnetic disk storage devices, one or more optical storage devices and/or flash memories (for example, NAND or NOR memory).

The extended memory 1170 or the internal memory 1104 stores software. Software components include an operating system, a software module, a communication software module, a graphic software module, a user interface software module and an MPEG module, a camera software module, one or more application software modules, and/or the like. In addition, because the module that is the software component may be indicated by a set of instructions, the module is also indicated by an instruction set. The module is also indicated by a program.

The operating system software includes several software components that control general system operations. The control of such general system operations means memory management and control, storage hardware (device) control and management, power control and management, and/or the like. Such operating system software also performs a function of making the communication between several hardware pieces and software components (modules) smooth.

The communication software module enables the communication with other electronic devices such as a computer, a server, and/or a portable terminal. In addition, the communication software module has a protocol structure that corresponds to a corresponding communication technique.

The graphic software module includes several software components for providing and displaying graphics to the first screen 1160 and/or the second screen 1161. The term "graphics" is used as a meaning that includes texts, web pages, icons, digital images, videos, or animation.

The user interface software module includes several software components related to the user interface. The user interface software module includes details of how the state of the user interface is changed or under which condition the state of the user interface is changed.

The camera software module includes camera related software components that enable camera related processes and functions. The application module includes a web browser function including a rendering engine, an e-mail function, a word processing function, a keyboard emulation function, an address book function, a touch list function, a widget function, a Digital Right Management (DRM) function, a voice recognition function, a voice copy function, a position determining function, a location based service, and/or the like. The memories (e.g., the extended memory 1170 and/or the internal memory 1104) may include further modules (instructions) in addition to the above-described modules. Alternatively, some modules (instructions) may not be used as needed.

The application module includes instructions for multitasking control (see FIGS. 10 and 11) according to various embodiments of the present disclosure.

In particular, the application module includes an instruction to detect a first gesture which reverses a first direction of a first screen 1160 executing a first application to a second direction and reverses the second direction of a second screen 1161 to the first direction. For example, as illustrated in FIG. 3A, the application module includes an instruction to detect that a front display and a back display are horizontally reversed by a user. In addition, the application module includes an instruction to display a first list of applications on the second screen 1161 of which the second direction is reversed to the first direction as illustrated in FIG. 3B, when the first gesture is detected. The application module includes instructions to detect a touch for selecting a second application from the first list of applications, execute and display the touched second application on the second screen having the first direction, and detect a second gesture which reverses the first direction of the second screen executing the second application to the second direction and reverses the second direction of the first screen to the first direction. In addition, the application module includes an instruction to display the first application previously executed on the first screen having the first direction, when the second gesture is detected. Each of the first and the second lists of applications is one of a multitasking list representing applications being executed on the background, a history list representing applications previously executed, and a list of all applications.

According to various embodiments of the present disclosure, the application module includes an instruction to detect a first gesture which reverses a first direction of a first screen executing a first application to a second direction and reverses the second direction of a second screen to the first direction. For example, as illustrated in FIG. 4A, the application module includes an instruction to detect that a front display and a back display are horizontally reversed by a user. In addition, the application module includes an instruction to display a first list of applications on the second screen of which the second direction is reversed to the first direction as illustrated in FIG. 4B, when the first gesture is detected. The application module includes instructions to detect a touch for selecting a second application from the first list of applications, execute and display the touched second application on the second screen having the first direction, and detect a second gesture which reverses the first direction of the second screen executing the second application to the second direction and reverses the second direction of the first screen to the first direction. In addition, the application module includes an instruction to display the first application previously executed on the first screen having the first direction, when the second gesture is detected.

According to various embodiments of the present disclosure, the application module includes instructions to execute a first application through a first direction, namely, a first screen and detect a gesture which reverses a first direction of a first screen executing a first application to a second direction and reverses the second direction of a second screen to the first direction. As illustrated in FIG. 5A, the application module includes instructions to detect that a front display and a back display are vertically (or horizontally) reversed by a user, execute and display a second application associated with the first application on the second screen having the first direction when the gesture is detected.

According to various embodiments of the present disclosure, the application module includes an instruction to detect a gesture which reverses a first direction of a first screen executing a first application to a second direction and reverses the second direction of a second screen to the first direction. For example, as illustrated in FIG. 6A, the application module includes instructions to detect that a front display and a back display are vertically (or horizontally) reversed by a user, determine (e.g., check) the number of applications being executed on the background when the gesture is detected, and display the application being executed on the background on the second screen having the first direction when the number of the applications being executed on the background is one. According to various embodiments of the present disclosure, when the number of applications being executed on the background is not one, the application module performs a corresponding mode. For example, in the corresponding mode, the application module includes instructions to display a list of applications on the second screen of which the second direction is reversed to the first direction, detect a touch for selecting one application from the list of applications, execute and display the touched application on the second screen having the first direction.

The methods according to various embodiments of the present disclosure described in the following claims and/or the specification may be implemented in hardware, software, or a combination thereof.

If the methods are implemented in software, a non-transitory computer readable storage medium storing one or more programs (software modules) may be provided. The one or more programs stored in the non-transitory computer readable storage medium are configured to be able to be executed by one or more processors in the electronic device. The one or more programs include instructions that perform the methods according to the various embodiments described in the following claims and/or the specification.

Such a program (software module, software) may be stored in a random access memory, a non-volatile memory including a flash memory, a Read Only Memory (ROM), an Electrically Erasable Programmable Read Only Memory (EEPROM), a magnetic disc storage device, a Compact Disc-ROM (CD-ROM), a Digital Versatile Disc (DVD) or different types of optical storage devices, a magnetic cassette, and/or the like. Alternatively, such a program may be stored in memories including combinations of some or all of these. According to various embodiments of the present disclosure, each memory may also be in plural forms.

According to various embodiments of the present disclosure, such a program may be stored in an attachable storage device that may access the electronic device through a communication network such as an internet, an intranet, a Local Area Network (LAN), a Wide LAN (WLAN), or a Storage Area Network (SAN), or a communication network including combinations thereof. Such a storage device may access the electronic device through an external port.

According to various embodiments of the present disclosure, a separate storage device on the communication network may access a portable electronic device.

As described above, by providing a multitasking technology using a double-sided display, various embodiments of the present disclosure have an advantage in that a user may conveniently perform two or more tasks by using the double-sided display.

According to various embodiments of the present disclosure, through a simple gesture, the user may easily move a screen from a first display to a second display to perform multitasking.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method in an electronic device comprising a double sided display, the method comprising:
   detecting a first movement of the electronic device, the first movement reversing a first screen on which a first application is executed;
   displaying, in response to detecting the first movement reversing the first screen, a first list of applications on a second screen;
   detecting an input for selecting a second application from the first list of applications; and
   executing and displaying the selected second application on the second screen.

2. The method of claim 1, wherein the displaying of the second application being executed comprises:
   detecting a second movement of the electronic device, the second movement reversing the second screen on which the second application is executed; and
   displaying a second list of applications on the first screen in response to detecting the second movement.

3. The method of claim 2, further comprising:
   determining at least one of the first list of applications or the second list of applications.

4. The method of claim 3, wherein the determined list of applications comprises one of a multitasking list representing applications being executed on a background, a history list representing applications previously executed, a list of favorite applications, a list of recently downloaded applications, a list of recently executed applications, a list of applications associated with the first application, or a list of all applications.

5. The method of claim 1, further comprising:
   detecting a second movement of the electronic device, the second movement reversing the second screen on which the second application is executed; and
   displaying the first application executed on the first screen, in response to detecting the second movement.

6. The method of claim 1, wherein the first screen is arranged to face the second screen.

7. The method of claim 1, wherein when the first screen is activated, the second screen is inactivated, and when the second screen is activated, the first screen is inactivated.

8. A non-transitory computer-readable storage medium storing instructions that, when executed, cause at least one processor to perform the method of claim 1.

9. An electronic device comprising:
   a first screen;
   a second screen;
   at least one processor;
   a memory; and
   at least one program stored in the memory and configured to be executed by the at least one processor, wherein the at least one program comprises instructions to:
      detect a first movement of the electronic device, the first movement reversing the first screen on which a first application is executed,
      display, in response to detecting the first movement reversing the first screen, a first list of applications on the second screen,
      detect an input for selecting a second application from the first list of applications, and
      execute and display the selected second application on the second screen.

10. The electronic device of claim 9, wherein the at least one program further comprises instructions to:
  detect a second movement of the electronic device, the second movement reversing the second screen on which the second application is executed; and
  display a second list of applications on the first screen in response to detecting the second movement.

11. The electronic device of claim 10, wherein the at least one program further comprises an instruction to determine at least one of the first list of applications or the second list of applications.

12. The electronic device of claim 11, wherein the determined list of applications comprises one of a multitasking list representing applications being executed on a background, a history list representing applications previously executed, a list of favorite applications, a list of recently downloaded applications, a list of recently executed applications, a list of applications associated with the first application, or a list of all applications.

13. The electronic device of claim 9, wherein the at least one program further comprises instructions to:
  detect a second movement of the electronic device, the second movement reversing the second screen on which the second application is executed; and
  display the first application executed on the first screen, in response to detecting the second movement.

14. The electronic device of claim 9, wherein the first screen is arranged to face the second screen.

15. The electronic device of claim 9, wherein when the first screen is activated, the second screen is inactivated, and when the second screen is activated, the first screen is inactivated.

16. A method of controlling multitasking in an electronic device comprising a double-sided display, the method comprising:
  detecting a movement of the electronic device, the movement reversing a first screen on which a first application is executed;
  executing and displaying a second application associated with the first application on a second screen in response to detecting the movement;
  displaying a list of applications on the second screen, in response to determining that a number of applications being executed on a background is not one;
  detecting an input for selecting one application from the list of applications; and
  executing and displaying the selected application on the second screen.

17. The method of claim 16, wherein the first screen is arranged to face the second screen.

18. The method of claim 16, wherein when the first screen is activated, the second screen is inactivated, and when the second screen is activated, the first screen is inactivated.

19. The method of claim 16, further comprising:
  determining the number of applications being executed on the background in response to detecting the movement; and
  displaying, on the second screen, the application being executed on the background, in response to determining that the number of applications being executed on the background is one.

20. A non-transitory computer-readable storage medium storing instructions that, when executed, cause at least one processor to perform the method of claim 16.

21. An electronic device comprising:
  a first screen;
  a second screen;
  at least one processor;
  a memory; and
  at least one program stored in the memory and configured to be executed by the at least one processor, wherein the at least one program comprises instructions to:
    detect a movement of the electronic device, the movement reversing the first screen on which a first application is executed,
    execute and display a second application associated with the first application on the second screen in response to detecting the movement,
    display a list of applications on the second screen, in response to determining that a number of applications being executed on a background is not one,
    detect an input for selecting one application from the list of applications, and
    execute and display the selected application on the second screen.

22. The electronic device of claim 21, wherein the first screen is arranged to face the second screen.

23. The electronic device of claim 21, wherein, when the first screen is activated, the second screen is inactivated, and when the second screen is activated, the first screen is inactivated.

24. The electronic device of claim 21, wherein the at least one program further comprises instructions to:
  determine the number of applications being executed on the background in response to detecting the movement; and
  display, on the second screen, the application being executed on the background, in response to determining that the number of applications being executed on the background is one.

25. A method of controlling multitasking in an electronic device comprising a double-sided display, the method comprising:
  detecting an axis of rotation and a direction of the rotation by which the double-sided display of the electronic device is reversed; and
  displaying a specific application on one side of the double-sided display of the electronic device, according to the detected axis and the direction of the rotation by which the double-sided display of the electronic device is reversed,
  wherein the displaying of the specific application on one side of the double-sided display of the electronic device comprises at least one of:
    displaying a list of applications recently executed when the double-sided display is reversed by a first direction, and selecting and displaying one application from the list of applications recently executed,
    displaying a list of applications being executed on a background when the double-sided display is reversed by a second direction, and selecting and displaying one application from the list of applications being executed on the background, or
    displaying a list of all applications when the double-sided display is reversed by a third direction, and selecting and displaying one application from the list of all applications.

26. The method of claim 25, wherein the direction by which the double-sided display of the electronic device is reversed comprises one of:
  the first direction in which the display rotates around a vertical axis from a left side to a right side,
  the second direction in which the display rotates around the vertical axis from the right side to the left side, the third direction in which the display rotates around a horizontal axis from an upper side to a lower side, and a fourth direction in which the display rotates around the horizontal axis from the lower side to the upper side.

27. A non-transitory computer-readable storage medium storing instructions that, when executed, cause at least one processor to perform the method of claim 25.

\* \* \* \* \*